(12) United States Patent
Herding et al.

(10) Patent No.: US 6,183,530 B1
(45) Date of Patent: *Feb. 6, 2001

(54) FILTER UNIT SUITABLE FOR EXCHANGEABLE INSERTION IN THE HOUSING OF A FILTER SYSTEM

(75) Inventors: Urs Herding, Ursensollen; Hans-Joachim Adlhoch, Kümmersbruck, both of (DE)

(73) Assignee: Herding GmbH Filtertechnik, Amberg (DE)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 09/182,421

(22) Filed: Oct. 30, 1998

(30) Foreign Application Priority Data

Oct. 22, 1998 (DE) .............................. 198 48 774

(51) Int. Cl.7 .............................. B01D 39/16; B01D 46/24
(52) U.S. Cl. .................................. 55/523; 55/522; 55/528
(58) Field of Search ............................ 55/522, 523, 524, 55/528, DIG. 5

(56) References Cited

U.S. PATENT DOCUMENTS

| 3,950,152 | * | 4/1976 | Guon ........................................ 55/523 |
| 4,370,376 | * | 1/1983 | Gangal et al. ........................ 55/524 |
| 4,979,969 | * | 12/1990 | Herding ................................. 55/523 |
| 5,547,481 | * | 8/1996 | Herding et al. ........................ 55/523 |

FOREIGN PATENT DOCUMENTS

| 4211529A1 | * | 4/1992 | (DE) . |
| 44 18 032 A1 | | 12/1995 | (DE) . |
| 0 250 801 | | 1/1988 | (EP) . |
| 931062 | | 7/1963 | (GB) . |
| WO 96/13320 | | 5/1996 | (WO) . |

* cited by examiner

Primary Examiner—David A. Simmons
Assistant Examiner—Minh-Chau T. Pham
(74) Attorney, Agent, or Firm—Venable; George H. Spencer; Catherine M. Voorhees

(57) ABSTRACT

A filter unit for exchangeable insertion in a housing of a filter system having a supporting component for supporting a filter unit in the housing; a multiplicity of individual, hollow filter elements wherein each filter element has an outer afflux surface for fluid to be filtered and an open surface portion for the outflow of filtered fluid from an interior of the filter element; and a casting resin. The hollow filter elements are united with the supporting component in such a manner that the filter elements are located substantially in their entirety on the second side of the supporting component. The filter elements are inherently stable filter elements composed with porously sintered together particles. The unification of the filter elements and the supporting component is effected by the casting resin covering the filter elements with a height of at least 1 cm. The casting resin slightly constricts the open surface portion of the filter elements and preferably constitutes the supporting component of the filter unit.

14 Claims, 3 Drawing Sheets

FILTER UNIT SUITABLE FOR EXCHANGEABLE INSERTION IN THE HOUSING OF A FILTER SYSTEM

BACKGROUND OF THE INVENTION

1. Field of the Invention

The subject matter of the invention is a filter unit for exchangeable insertion in the housing of a filter system, comprising the following features:

(a) the filter unit has a supporting component provided for supporting the filter unit in the housing and having a first side and an opposite, second side, the first side being provided facing the clean gas space of the housing for installation therein;

(b) a multiplicity of individual, hollow filter elements, each having an outer afflux surface for fluid to be filtered and an open surface portion for the outflow of filtered fluid from the interior of the filter element, is united with the supporting component in such a manner that the filter elements are located substantially in their entirety on the second side of the supporting component and provide good utilization of the space on the second side of the supporting component;

(c) the filter elements are inherently stable filter elements composed with porously sintered together particles;

(d) the unification of the filter elements and the supporting component is effected in common for the filter elements by a casting resin covering the filter elements on the outside with a height of at least 1 cm each and constricting the open surface portions of the filter elements at the most to a slight extent, the casting resin preferably constituting at the same time the supporting component of the filter unit.

2. Description of Related Art

Filter units for exchangeable insertion in the housing of filter systems are known in a variety of forms. In a frequently employed form, the filter element proper consists of a paper web or fibrous web folded in zigzag manner, which e.g. is brought into a total circular-annular configuration and which at both face ends thereof is received in the housing of the filter system in sealed manner.

In addition thereto, inherently stable filter elements are known which are composed with porously sintered together plastics particles and are substantially the shape of a hollow, flat, right parallelepiped open on one side (DE 42 11 529 A1). Such filter elements, in a multiplicity thereof, so far have not been united together by a casting resin so as to provide an exchangeable filter unit.

SUMMARY OF THE INVENTION

Inherently stable filter elements composed with porously sintered together particles can be produced in a considerable size—as compared with filter elements of other types. The invention provides a filter unit in which such filter elements, in a multiplicity thereof, are combined in advantageous manner in terms of manufacture so as to form an exchangeable filter unit. The common casting resin covers surface areas of the filter elements in such a manner that a filter unit united in stable manner results.

The casting resin preferably constitutes at the same time the supporting component of the filter unit. However, as an alternative it is possible that the supporting component additionally contains a force-receiving member, e.g. a metal plate, covered on one side or on both sides by the casting resin.

The filter unit preferably comprises at least four filter elements.

The supporting component, as seen in viewing direction towards its first side, preferably is of circular or rectangular, in particular square shape.

The filter elements each preferably have substantially the configuration of a hollow, flat, right parallelepiped open on one side, the two large faces of the right parallelepiped having preferably a corrugated or a zigzag path. The corrugated or zigzag path is preferably such that the "wave crests" and "apexes", respectively, extend substantially at right angles to the second side of the supporting component.

According to a preferred development of the invention, the filter elements are composed with sintered together plastics particles, preferably polyethylene particles, which is advantageous in terms of manufacture.

The filter elements, at their afflux surfaces, are preferably provided with a finer-pore coating. Due to this, the filter elements are capable of operating in accordance with the principle of surface filtration so that filtered-out particles do not penetrate into the depth of the material of the filter element and clog the filter element. Filter elements having a finer-pore coating can be cleaned off more easily by the counter-flow pulse principle. The finer-pore coating can be established preferably by fibers and/or particles smaller than those particles of which the filter element main body is composed.

It is possible to provide on the first side of the supporting component a transition piece for providing an, in terms of flow, advantageous transition to a cross-section of flow of different size and/or different geometry. Typical examples are a transition to a smaller cross-section of flow and a transition from a rectangular supporting component to a round cross-section of flow.

The filter unit according to the invention preferably is a filter unit of considerable size. The filter elements, as measured along the viewing direction towards the second side of the supporting component, preferably have a height of at least 50 cm. As seen in the viewing direction towards the first side of the supporting component, the supporting component preferably has a plan view surface area of at least 900 cm$^2$.

BRIEF DESCRIPTION OF THE DRAWINGS

The invention and developments of the invention will be elucidated in more detail hereinafter by way of embodiments shown in the drawings wherein.

DETAILED DESCRIPTION OF INVENTION

Figure 1:
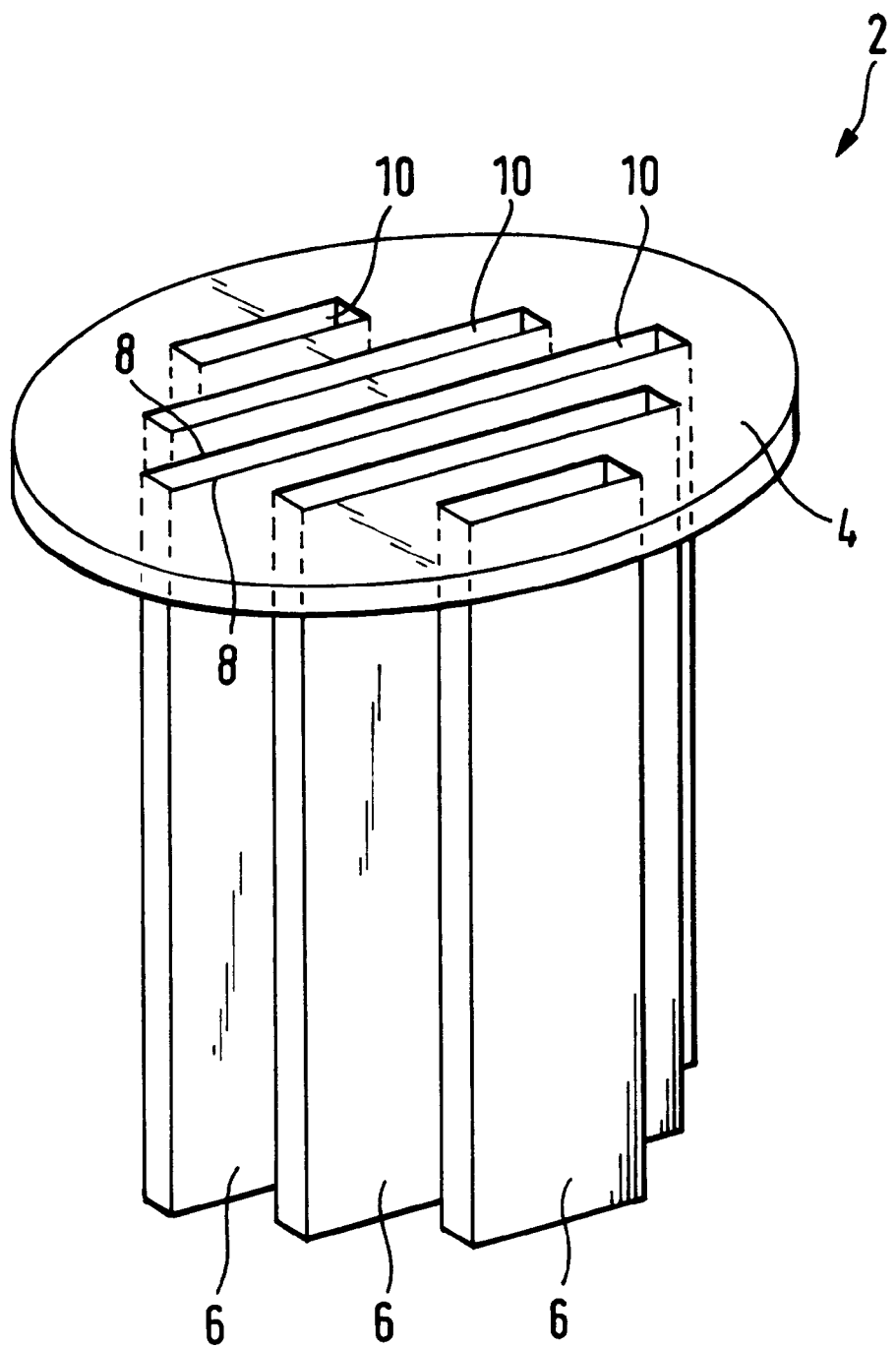
FIG. 1 is a schematic perspective view of a filter unit according to the invention.

FIG. 1 schematically shows a first embodiment of the filter unit 2. Filter unit 2 consists of a supporting component 4 having substantially the shape of a circular plate, and five filter elements 6. Each of the filter elements 6 has the shape of a hollow, flat, right parallelepiped open at its upper side in FIG. 1, with the other five sides of the right parallelepiped being in the form of closed walls. The two large faces 8 of each right parallelepiped extend in zigzag fashion to increase the surface area of the respective filter element 6; for maintaining clarity, this is not shown in FIG. 1, but is visible in the more detailed representation of FIG. 2. Except for the upper, open right parallelepiped side 10, the entire outer surface of each filter element 6 constitutes the afflux surface thereof. The filtered fluid, e.g. air, is sucked off through the open sides 10 of the filter elements 6.

The supporting component 4 consists of a casting resin, preferably phenolic resin, epoxy resin or polyurethane.

Figure 3:
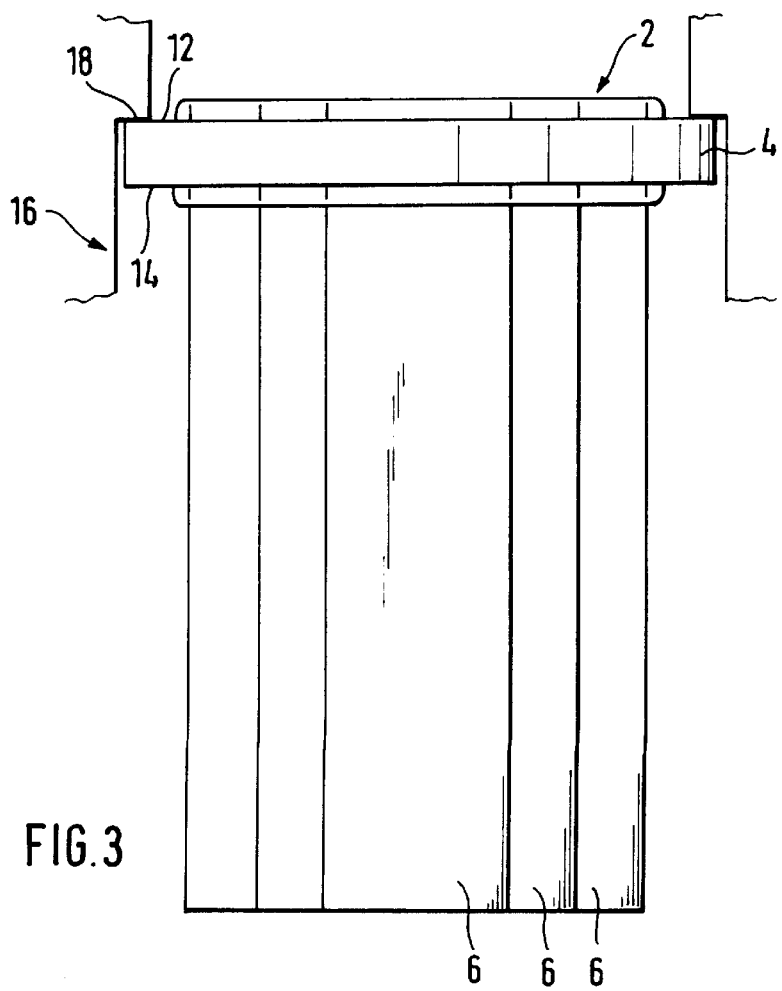
FIG. 3 is a side view according to arrow III of the filter unit of FIG. 2.

As can be seen in particular from the detailed representation of FIG. 3, the filter elements 6 terminate a distance above the upper main surface 12 of supporting component 4. The casting resin encloses each filter element 6 on four sides of the right parallelepiped from the outside, and at these right parallelepiped sides extends a short distance above beyond the upper main confining surface 12 and below beyond the lower main confining surface 14 of supporting component 4. This provides a good dimension in height of the connecting region of filter elements 6 and supporting component 4. The upper side of supporting component 4 in FIG. 3 is referred to as "first side" in the present application, whereas the bottom side of supporting component 4 in FIG. 3 is referred to as "second side".

Figure 2:
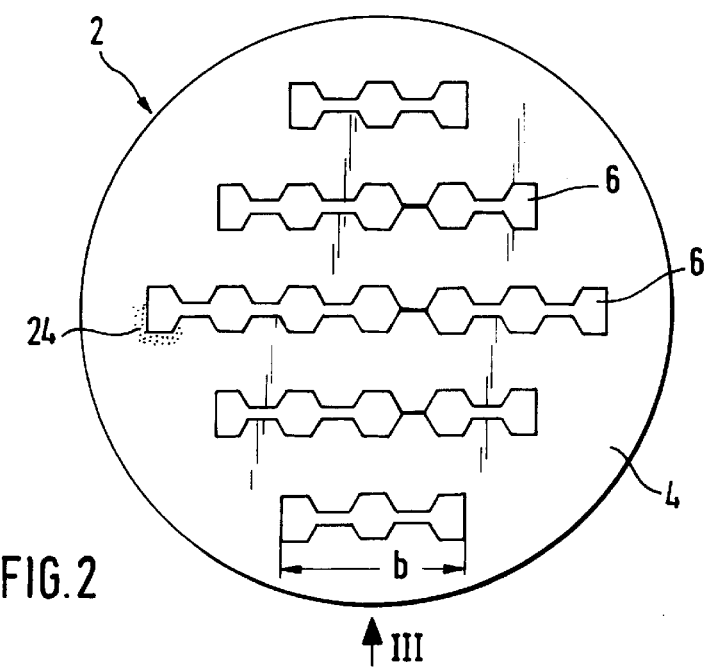
FIG. 2 is a plan view of the filter unit of FIG. 1.

It can be seen in FIG. 2 that the large faces 8 of the larger filter elements 6 are connected to each other from both sides thereof at at least one location.

FIG. 3 also shows a housing 16 of a filter system. The substantially cylindrical wall of housing 16 has a downwardly facing shoulder 18 on which the upper outer edge of supporting component 4 abuts. Suitable fastening means for fixing this filter system are not shown in the drawing. It is possible as an alternative to design housing 16 with an upwardly facing shoulder and have the supporting component 4 abut against this shoulder from above in downward direction. In addition to housing 16, a typical filter system comprises a connecting piece for supplying fluid to be filtered to housing 16, a connecting piece for discharging filtered fluid from housing 16, an air suction fan as well as means for cleaning off the filter elements 6 by return flow air jets.

It can be seen in FIGS. 1 to 3 that filter elements 6 are of different widths b. Filter elements 6 are each formed with such a width b and arranged with such a mutual spacing and spacing towards the edge of supporting component 4 that good exploitation of the space on the second side of supporting component 4 is achieved.

The edges of the zigzag path of the large faces 8 of filter elements 6 are not shown in FIG. 3 for the sake of maintaining clarity.

Figure 4:
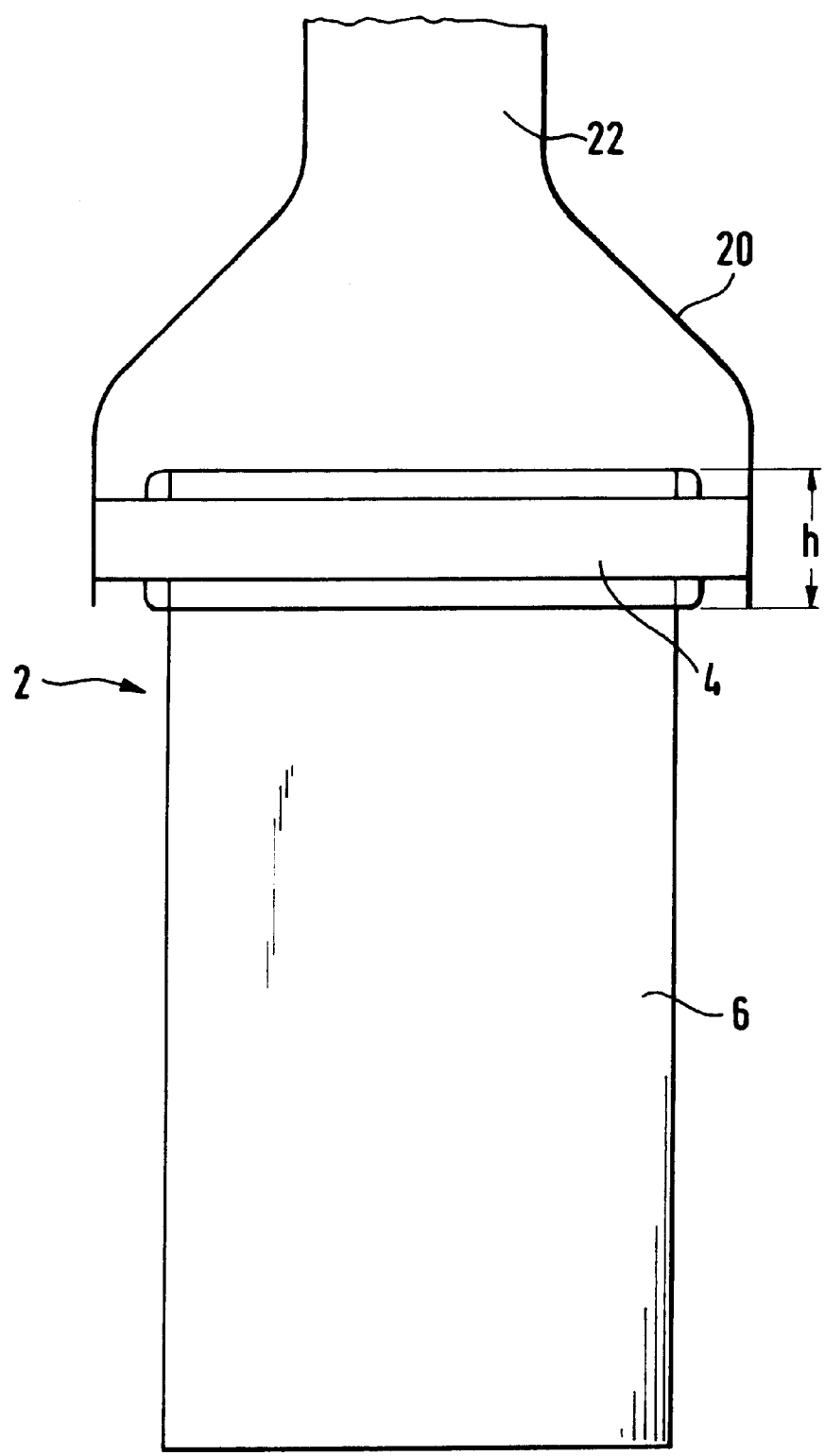
FIG. 4 is a side view of another embodiment of the filter unit.

FIG. 4, in a viewing direction analogous with FIG. 3, shows a filter unit 2 in which supporting component 4 is of square configuration in plan view, with all filter elements 6 having the same width b. As for the rest, the design of filter unit 2 is completely analogous with the first embodiment. However, there is shown a transition piece 20 establishing an, in terms of flow, advantageous transition from the square outline of supporting component 4 to a smaller, circular cross-section of flow 22. Transition piece 20 consists e.g. of sheet metal.

FIG. 2 shows at one location of a filter element 6 a finer-pore coating 24—which is drawn to an enlarged scale for the purpose of illustration. It is to be understood that the finer-pore coating 24 is applied everywhere on the afflux surfaces of all filter elements 6.

In the embodiments depicted in the drawings, the situation was such that the casting resin of supporting component 4 has covered the outside of the respective filter element 6 over a height h (cf. FIG. 4), but not the upper final face area of the respective filter element 6, nor any location on the inside of the wall of the respective filter element 6. It is possible, however, to modify the design of the filter unit such that the casting resin covers also the upper face area of the respective filter element 6 or extends even beyond this upper face area so as to cover also a portion on the inside of the walls of the respective filter element 6 located there. With such a design, the combination stability between supporting component 4 and filter elements 6 is further increased. However, care should be taken that the covering of the insides of the walls of filter elements 6 is so thin that the cross-sectional area of flow of the upper, open filter element side 10 is constricted to a slight extent only.

Differently from the embodiments shown in the drawings, it is possible as an alternative for the filter element 6 to end flush with or even somewhat below the upper main surface 12. In the latter case, the casting resin is capable of covering the upper face area of the respective filter element 6 in particularly good manner.

What is claimed is:

1. A filter unit for exchangeable insertion in a housing of a filter system, said filter unit comprising: a supporting component for supporting the filter unit in the housing, said supporting component having a first side and an opposite, second side, the first side being installed facing a clean gas space of the housing;

(a) a multiplicity of individual, hollow filter elements, each filter element having an outer afflux surface for fluid to be filtered and an open surface portion for the outflow of filtered fluid from the interior of the filter element, wherein the multiplicity of individual, hollow filter elements is united with the supporting component in such a manner that the filter elements are located substantially in their entirety on the second side of the supporting component; and the filter elements are inherently stable filter elements composed with porously sintered together particles; and (b) a casting resin covering the filter elements wherein the unification of the filter elements and the supporting component is effected by the casting resin, said resin having a height of at least 1 cm over each filter element and slightly constricting the open surface portions of the filter elements.

2. The filter unit of claim 1, wherein the multiplicity of filter elements has at least four filter elements.

3. The filter unit of claim 1, wherein the supporting component is of circular configuration.

4. The filter unit of claim 1, wherein the supporting component is of rectangular configuration.

5. The filter unit of claim 1, wherein the filter elements each have substantially the configuration of a hollow, flat, right parallelepiped open on one side.

6. The filter unit of claim 1, wherein the filter elements are composed with sintered together plastics particles.

7. The filter unit of claim 1, wherein the afflux surface of the filter elements is provided with a finer-pore coating.

8. The filter unit of claim 1, further comprising a transition piece located on the first side of the supporting component and providing a flow transition from a cross-sectional area of one size to a cross-sectional area of a different size.

9. The filter unit of claim 1, wherein the filter elements have a height of at least 50 cm.

10. The filter unit of claim 1, wherein the supporting component has a plan area of at least 900 cm$^2$.

11. The filter unit according to claim 1, wherein the casting resin is the supporting component of the filter unit.

12. The filter unit according to claim 5, wherein the two large faces of the right parallelepiped have a corrugated or zigzag path.

13. The filter unit according to claim 6, wherein the filter elements are composed with sintered together polyethylene particles.

14. The filter unit of claim 1, further comprising a transition piece located on the first side of the supporting component and providing a flow transition from a cross-sectional area of one geometry to a cross-sectional area of a different geometry.

\* \* \* \* \*